United States Patent [19]

Glass et al.

[11] Patent Number: 5,709,521
[45] Date of Patent: Jan. 20, 1998

[54] LIFT ASSIST BICYCLE CARRIER FOR CAR ROOFTOP

[76] Inventors: Dennis Glass, 600 N. Capitol St., Salt Lake City, Utah 84103; Anthony Ferrari, 10 Varborg Ter., San Anselmo, Calif. 94960

[21] Appl. No.: 651,051

[22] Filed: May 21, 1996

[51] Int. Cl.$^6$ .................................................. B60P 9/00
[52] U.S. Cl. .................... 414/462; 224/310; 224/324; 224/924
[58] Field of Search ..................... 414/462; 211/17, 211/18; 224/282, 309, 310, 319, 321, 324, 924

[56] References Cited

U.S. PATENT DOCUMENTS

| | | | |
|---|---|---|---|
| 577,808 | 2/1897 | Myers | 211/18 |
| 579,584 | 3/1897 | Jessup | 211/17 |
| 3,826,390 | 7/1974 | Watson | 414/462 |
| 3,872,972 | 3/1975 | Cummins et al. | 211/17 |
| 4,339,223 | 7/1982 | Golze | 414/462 |
| 4,400,129 | 8/1983 | Eisenberg et al. | 414/462 |
| 4,808,056 | 2/1989 | Oshima | 414/462 |
| 4,826,387 | 5/1989 | Audet | 414/462 |
| 4,934,572 | 6/1990 | Bowman et al. | 211/17 |
| 5,108,018 | 4/1992 | Spinka | 224/924 |
| 5,209,628 | 5/1993 | Hassell | 224/282 |
| 5,284,282 | 2/1994 | Mottino | 224/310 |
| 5,360,150 | 11/1994 | Praz | 224/924 |
| 5,360,151 | 11/1994 | Fine | 224/310 |
| 5,421,395 | 6/1995 | Bubik et al. | 224/42.03 |
| 5,435,475 | 7/1995 | Hudson et al. | 224/924 |
| 5,456,564 | 10/1995 | Bianchini | 224/924 |
| 5,509,776 | 4/1996 | Specht et al. | 414/462 |
| 5,527,146 | 6/1996 | Allsop et al. | 224/924 |
| 5,529,231 | 6/1996 | Burgess | 224/924 |
| 5,624,063 | 4/1997 | Ireland | 224/924 |

FOREIGN PATENT DOCUMENTS

| | | | |
|---|---|---|---|
| 9211174 | 7/1992 | European Pat. Off. | |
| 2654688 | 5/1991 | France | 224/310 |
| 3610847 | 10/1986 | Germany | 224/924 |
| 94/03345 | 2/1994 | WIPO | 224/310 |

OTHER PUBLICATIONS

Red Rock Industries Brochure, Rak–n–Loc, Rak Model PC–3 and PC–2.

*Primary Examiner*—Karen B. Merritt
*Assistant Examiner*—Douglas Hess
*Attorney, Agent, or Firm*—Mallinckrodt & Mallinckrodt

[57] ABSTRACT

The bicycle carrier apparatus of the invention has a commercially obtainable pneumatic or similar power lift device positioned longitudinally in and along an elongate bicycle lifting and supporting columnar standard whose lower end is pivotally mounted on a preferably rotatable turntable as part of a mounting base that is adapted for attachment, usually through longitudinal bars inserted in such base, to conventional transverse bars of the usual rooftop luggage rack of an automotive vehicle. The columnar standard includes a bicycle-securing lift bar having a height adjustable lift arm carrying a device that is attachable to the frame of a bicycle to be carried in upstanding position on the rooftop of the vehicle and that accommodates the pivotal swinging movement of such lift bar and of the columnar standard to which it is attached. Also included in the columnar standard are components that guide the power stroke of the power lift device and transfer the power thereof to the columnar standard for raising or assisting in raising it from the down position to the upstanding position.

29 Claims, 6 Drawing Sheets

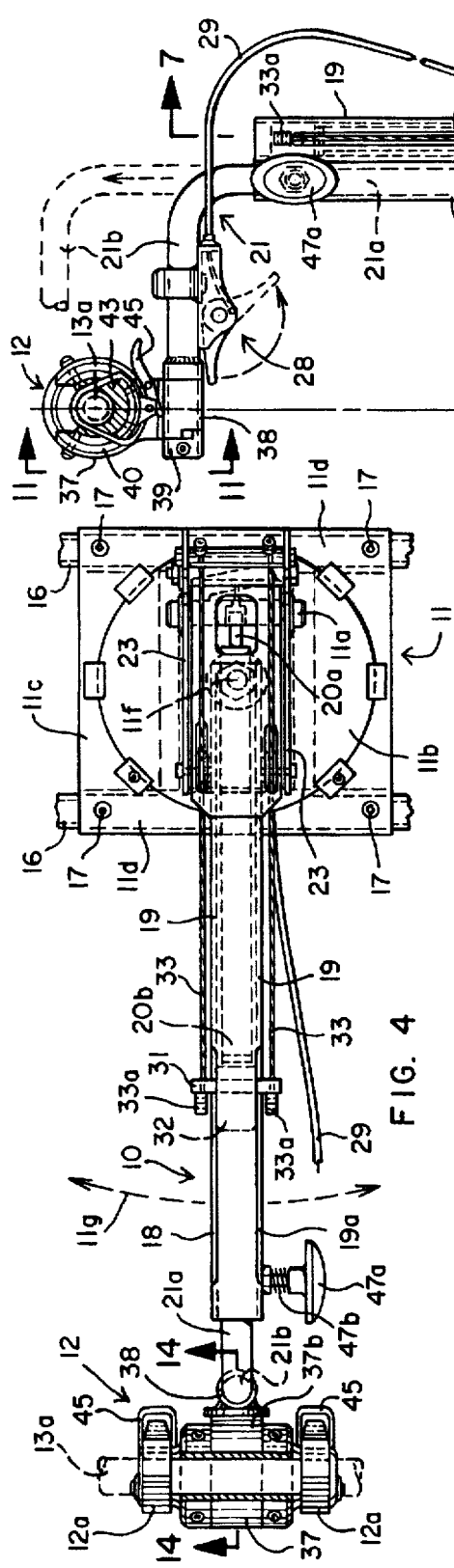
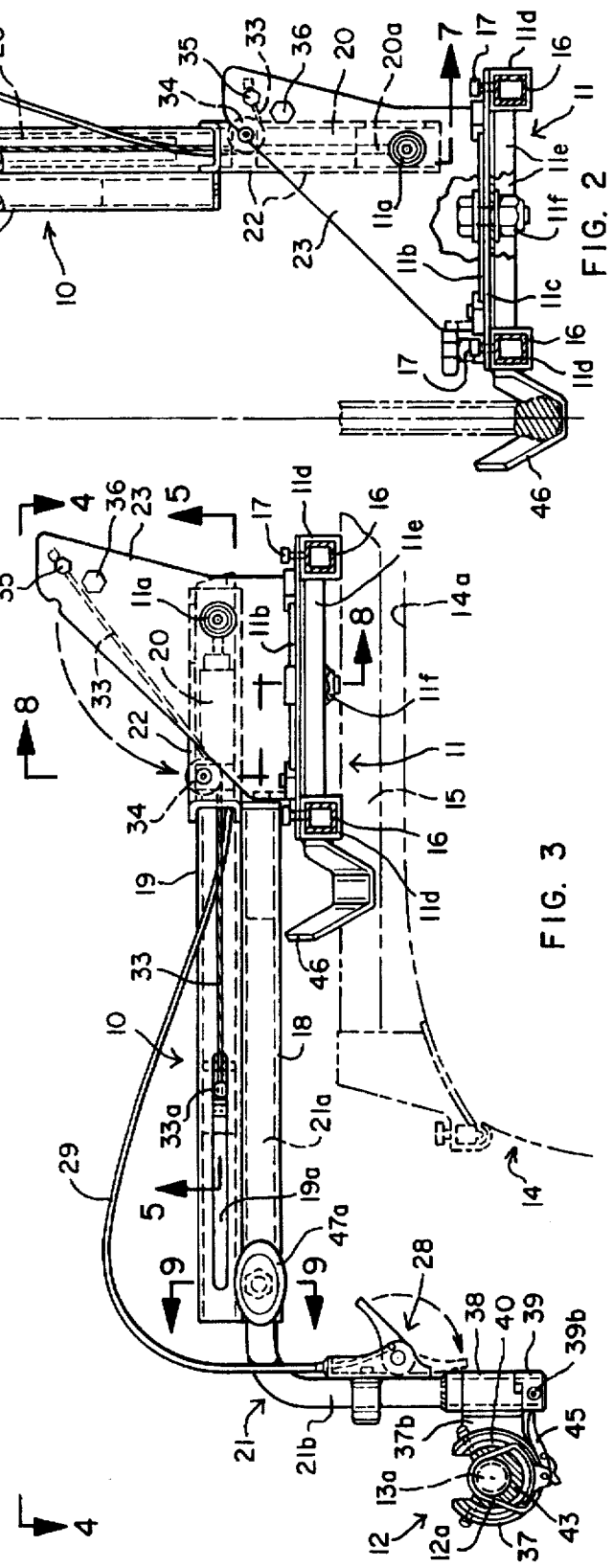

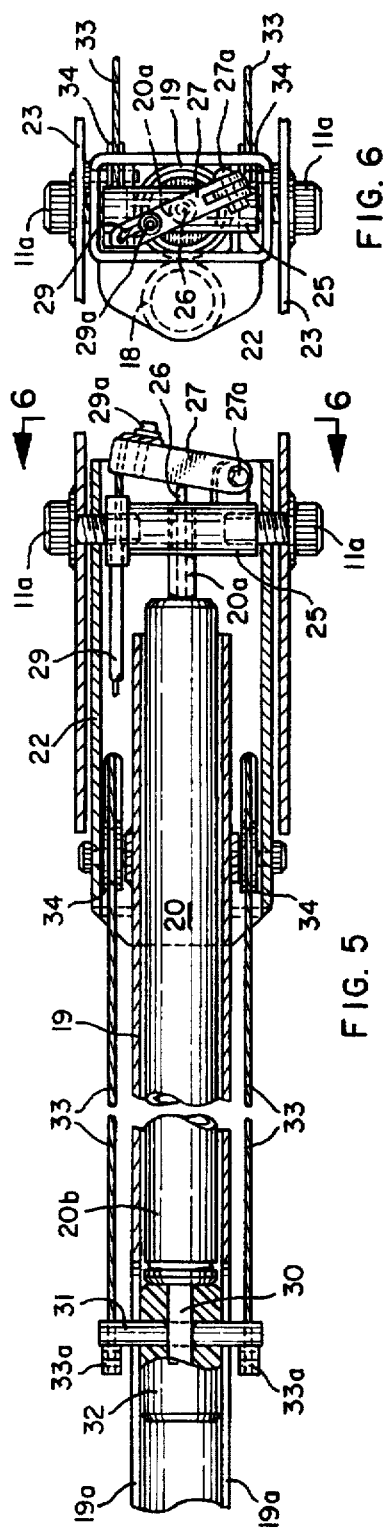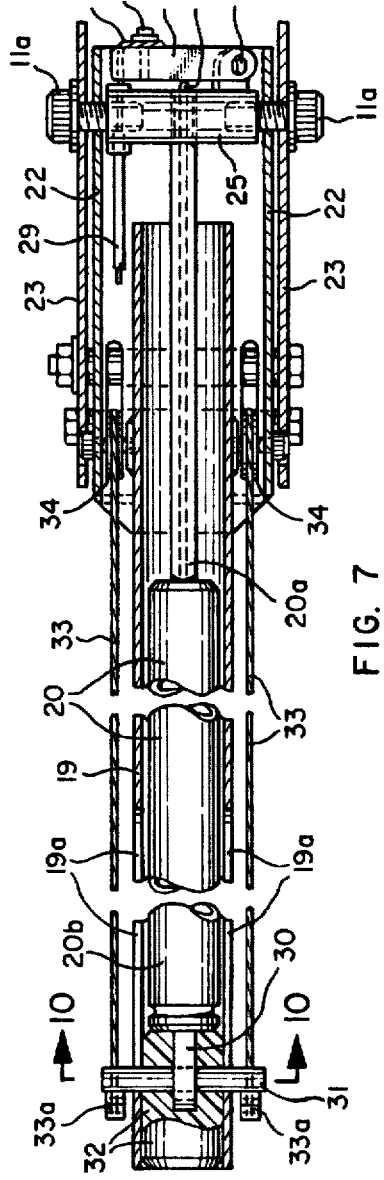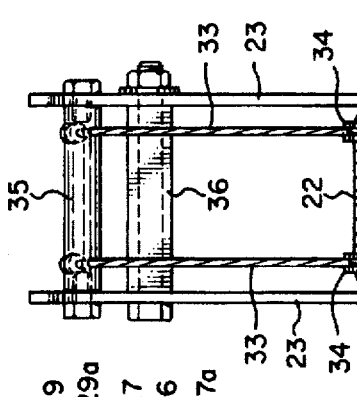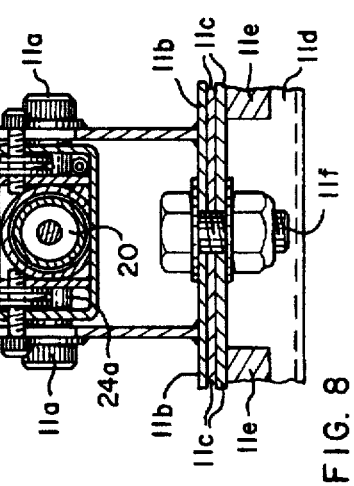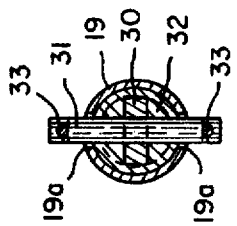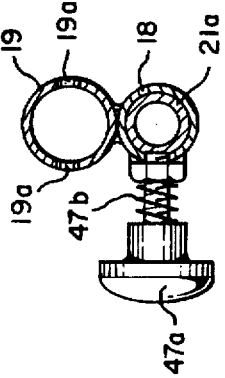

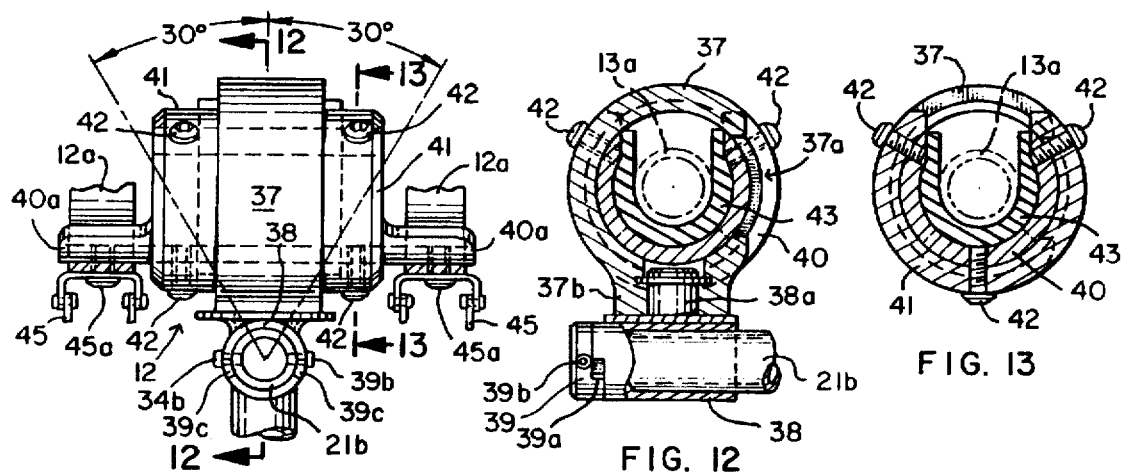
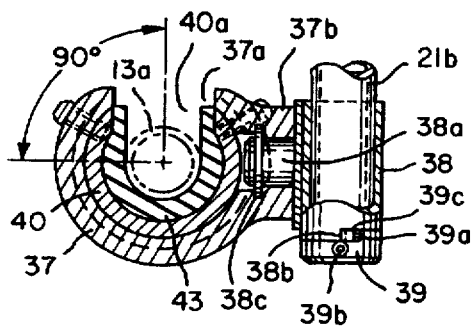
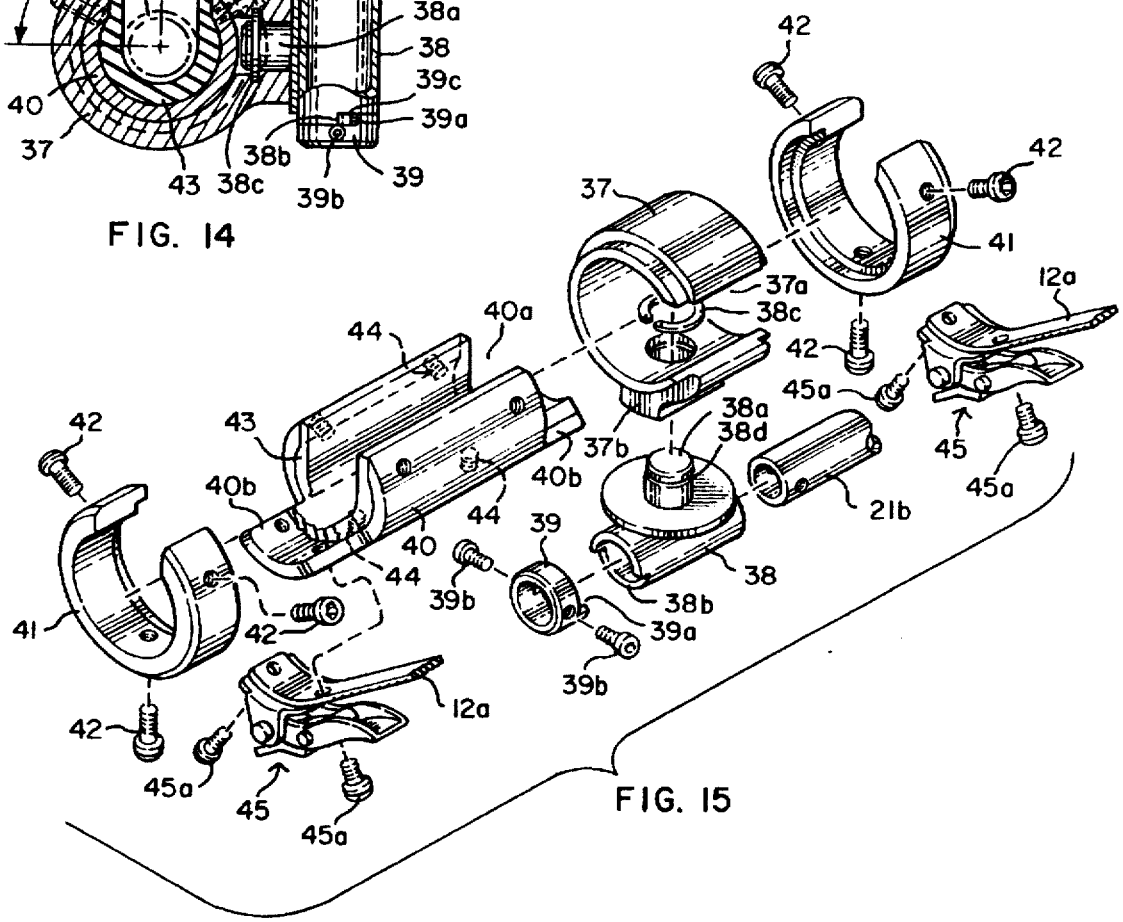

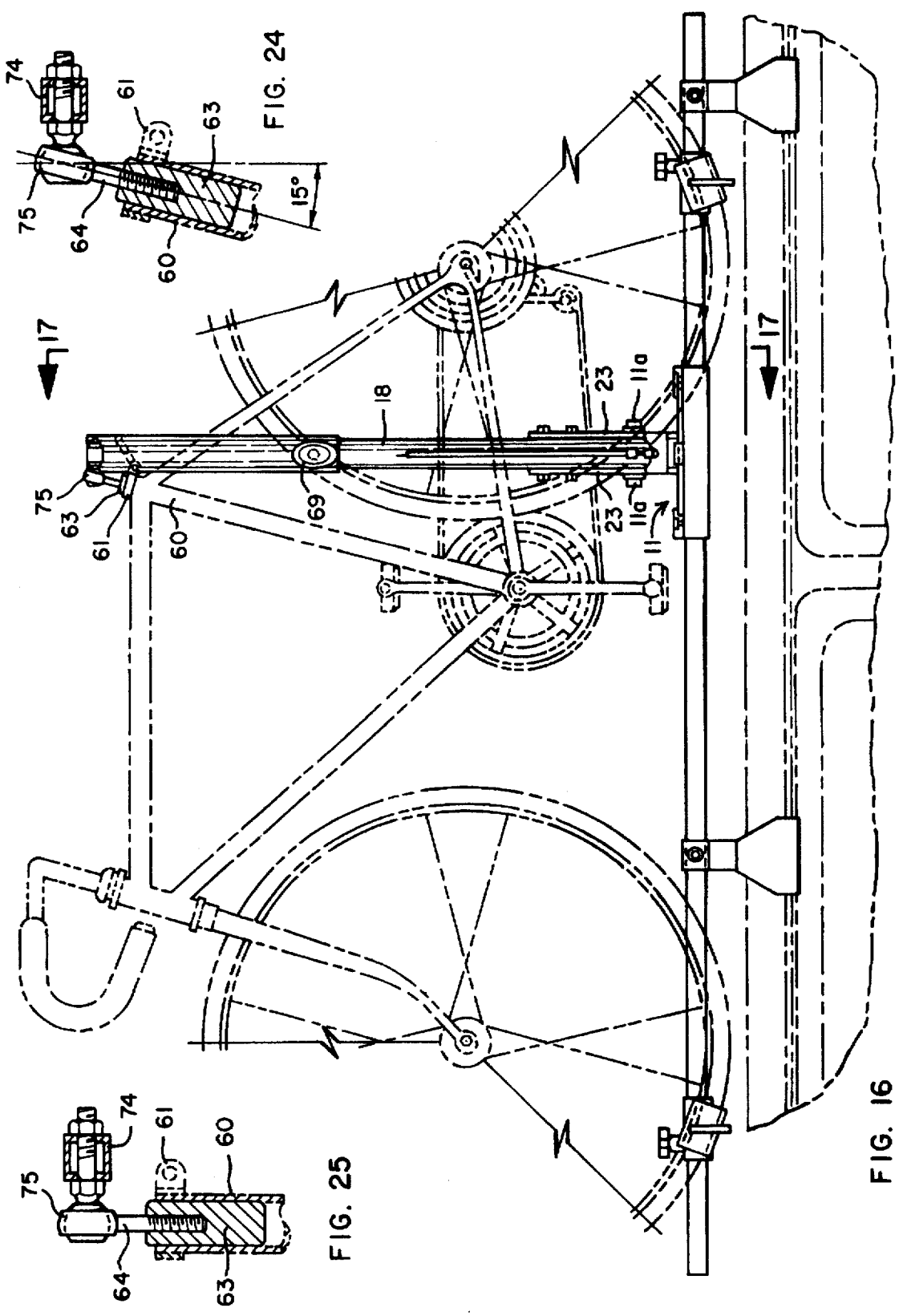

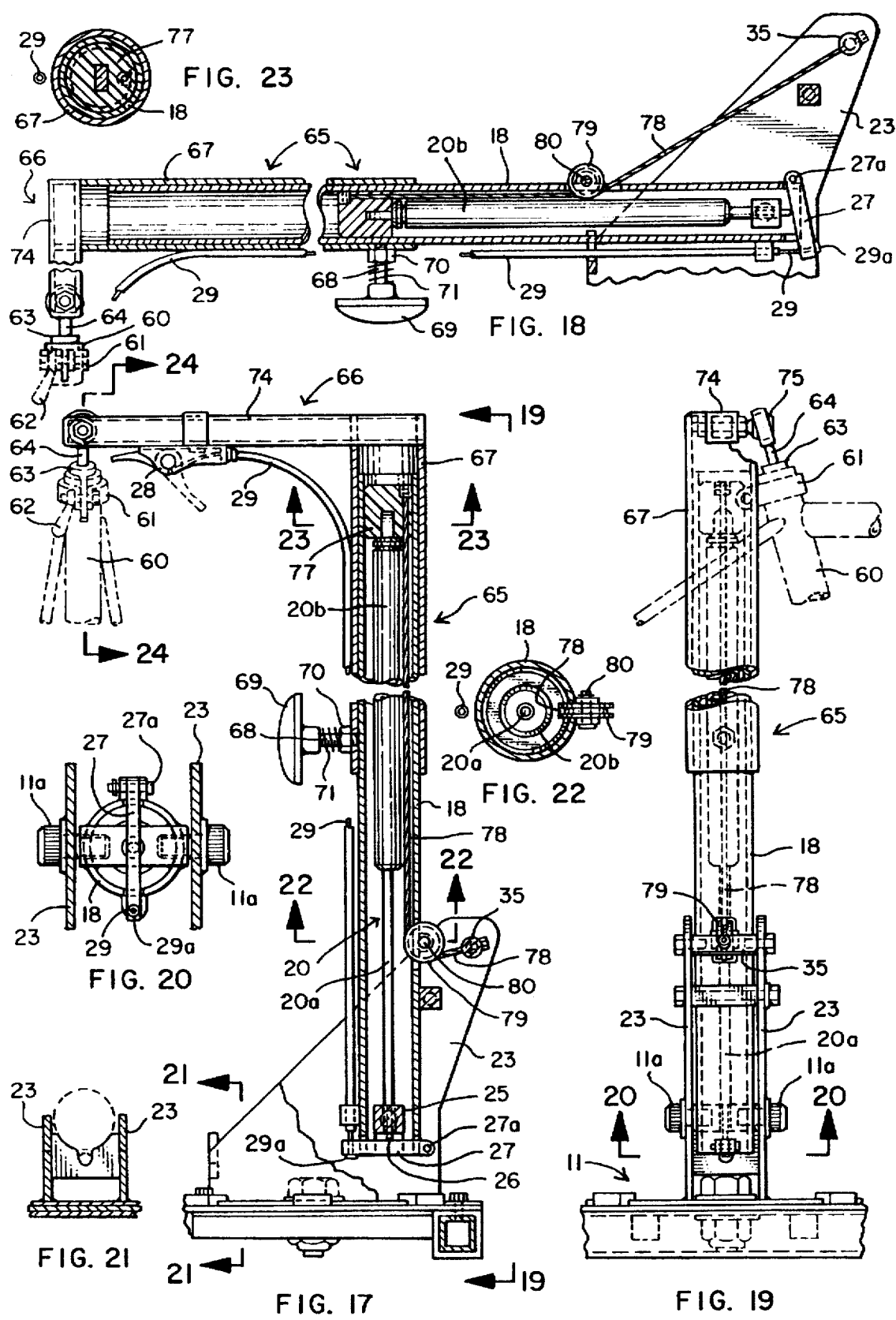

LIFT ASSIST BICYCLE CARRIER FOR CAR ROOFTOP

BACKGROUND OF THE INVENTION

1. Field

The invention is in the field of bicycle carriers for attachment to the rooftops of automotive vehicles.

2. State of the Art

Various constructions for apparatus of the type concerned have been proposed heretofore leading up to ones that can be conveniently lowered at a side of the vehicle and then lifted into travelling position on top of the vehicle roof.

U.S. Pat. No. 5,360,151 of Nov. 1, 1994 discloses a bicycle carrier of the latter type having a base frame for attachment to longitudinally extending bars of a conventional rooftop carrier rack that often comes as original equipment with passenger automobiles, especially station wagons and sport utility vehicles, or can be purchased as an extra for attachment to the rooftop of various automotive vehicles. Hingedly pivoted to such basic frame is a loading frame for positioning over an upstanding bicycle to be loaded and equipped to receive and hold the bicycle while being manually lifted and swung from the side of the vehicle to its rooftop for securement thereon for and during travel. The bicycle swings with the loading frame from upstanding position beside the vehicle to upside down position on top of the vehicle.

U.S. Pat. No. 5,284,282 of Feb. 8, 1994 shows a more complicated and seemingly less convenient arrangement having a bicycle loading and supporting standard extending from pivotal anchorage to one of the bars of a conventional rooftop carrier rack so it can be manually pulled down to a bicycle loading position at a side of the vehicle that is equipped with such carrier rack and can be manually raised to bicycle attachment and travelling position on top of the roof of the vehicle.

BRIEF SUMMARY OF THE INVENTION

It is a primary purpose of the invention to provide a lift assist bicycle loading and carrying rack for automotive vehicles, especially one that effectively incorporates an easily controlled, lift assist device in an upwardly and downwardly swingable bicycle carrier that is easily attachable to the rooftop of a vehicle, such as to a conventional rooftop luggage carrier of an automotive vehicle, for lifting one or more bicycles from standing position at and along a side of the vehicle. The lift assist device is preferably arranged to provide substantially constant lifting force throughout the range of lifting movement of the swingable bicycle carrier to effectively assist in lifting the bicycle to rooftop supporting position and to hold the bicycle in this supporting position.

This is accomplished by effectively incorporating in a bicycle lifting and carrying rack a commercially available lift assist power device, such as that sold by Slabilius GmbH of Koblenz-Neuendorf, Germany, under the trademark BLOC-O-LIFT, or similar device commonly referred to as an "air spring". In normal use of such a device to assist with lifting, such as when commonly used to assist with lifting an automobile "hatch back" door, the "air spring" is attached between the vehicle and the door spaced substantially from the pivot connection. As the door swings open or closed, the assisting force of the "air spring" increases or decreases because of the change in the effective length of the moment arm acted on by the "air spring" about the pivot point. A similar type of mounting is not effective for a bicycle rack because the required swing is difficult to achieve and effective lifting force is difficult to obtain to provide lifting assistance through the required swing of the lifting arm. If effective assistance is obtained at the beginning of the lifting swing, it is difficult to achieve effective holding force at the supporting end of the swing.

Preferably, the rack of the invention comprises a bicycle loading and supporting columnar standard that is attached at its lower end to a base which is secured to holding bars mounted to a usual rooftop luggage carrier of an automotive vehicle. The columnar standard is lifted and lowered on a substantially horizontal pivot axis. Such columnar standard is advantageously attached to a turntable component on the base structure, which has longitudinally extending bars attachable to the usual transversely extending bars of a conventional rooftop luggage carrier of the vehicle or to removably mounted transversely extending bars as are common with after market removable rooftop luggage racks, bicycle racks, or other carrying racks. As so mounted, such columnar standard holds received bicycle or bicycles in upright position on the rooftop of the vehicle, with front and rear wheels preferably held by fore and aft clamps that are adjustably mounted on the longitudinally extending bars provided as part of the base structure. For unloading, such columnar standard and the bicycle or bicycles which it supports are manually swung downwardly on the mounting base structure at a side of the vehicle after disconnecting the front and rear bicycle wheel clamps if, indeed, such clamps are provided.

In one embodiment of the invention, the upwardly and downwardly swingable columnar standard comprises two elongate structural tubes secured together in side-by-side longitudinally adjoining relationship, one of such tubes having the lift assist power device mounted therein and extending longitudinally therewith, the other tube having the leg member of an inverted, L-shaped, lift rod slidably fitted thereinto as bicycle carrying structure for lengthwise positional adjustment relative thereto and to the lift assist power device. Bicycle frame attachment means are carried by the bicycle carrying structure, as at the free end end of the relatively short lift arm member of such lift rod that extends perpendicularly from the leg member thereof. In a second embodiment, a single elongate structural tube is used with the bicycle carrying structure slidably extending over the structural tube for lengthwise positional adjustment.

The lift assist power device is lengthwise extendable by means of a piston and cylinder assembly, whose lower end is pivotally anchored at or adjacent to the pivot axis of the columnar standard and whose upper end is connected to power stroke guide means, which may be in the form of a slide bar extending transversely of the head of the cylinder, that serves as the extendable component of the piston and cylinder assembly, and into a pair of corresponding, oppositely positioned, longitudinal, receiving slots of the lift assist power device receiving tube of the columnar standard, so power stroke travel of the extendable component of the lift assist power device is guided by such receiving slots. Alternately, the guide means may be a disc or plug which slides in the tube. Flexible but non-extensible means, preferably a cable or pair of cables at opposite sides of the columnar standard, connect, by way of a guide pulley or respective guide pulleys, the power stroke guide means at an upper portion of the power lift device to the base structure. The length of such cables is such as will be tensioned during the power stroke of the power lift device to force such columnar standard to move upwardly from the down or bicycle loading and unloading position to its upstanding or bicycle supporting position on the rooftop during the full extent of the substantially ninety degree travel from down position to up position on a power stroke of the power lift device.

A manually operated control for the lift assist power device is provided, preferably for attachment to the bicycle carrying structure within convenient reach of the person loading or unloading the bicycle, as, for example, on the relatively short lift arm member of the lift rod.

One preferred bicycle attaching means for mounting or attaching a bicycle to the rack includes an elongate cradle structure rotatably attached to a lifting arm of the rack and having outer and inner cradles with open-ended, longitudinal entry openings for receiving and holding a portion of the frame of a bicycle to be mounted on the rack. The outer and inner cradles are rotatably arranged relative to each other to align their entry openings facing upwardly when a loading and supporting arm of the rack is in a loading and unloading position. A frame member of a bicycle to be held by the rack can be placed in the inner cradle. The entry opening of the outer cradle is moved out of alignment with the entry opening of the inner cradle when the arm is moved to its supporting position to close the opening thereby capturing and holding the received frame member of the held bicycle. For use with the preferred embodiments of the rack of the invention, the entry openings of the outer and inner cradles are aligned facing upwardly with the arm in a lowered loading and unloading position so a bicycle in upright position can be lifted and a portion of a frame member placed through the entry openings into the usually foam lined inner cradle. The arm is then lifted with the inner cradle maintaining its position with entry opening facing upwardly to maintain the bicycle in upright position as the arm is lifted and the bicycle moved over the vehicle rooftop. During this movement the outer cradle rotates with respect to the inner cradle so that with the arm in its up or supporting position, the outer cradle extends over the entry opening of the inner cradle to close the opening so the bicycle is locked to the arm.

In an alternate bicycle attaching means for use with bicycles having a quick release seat feature, a rod member of outside diameter equal to that of a tube extending from a seat normally used with the bicycle extends from the lifting arm of the rack. To secure a bicycle to the rack, the quick release feature is operated and the seat is removed from the bicycle. The rod member is then inserted into the bicycle frame in place of the tube extending from the seat and the quick release feature operated to secure the rod member to the bicycle. In this way the bicycle is secured to the arm.

THE DRAWINGS

The best mode presently contemplated for carrying out the invention in actual practice is illustrated in the accompanying drawings in which:

FIG. 1 is a side elevational view of the bicycle carrier with a bicycle held in erect, travelling position on top of the roof of an automotive vehicle, the bicycle carrier being secured to and between adjoining longitudinally extending bars of a base structure having a turntable on which the bicycle-receiving columnar standard is mounted, the rooftop of the automotive vehicle being partially indicated and the bicycle being shown by broken lines;

FIG. 2, a view in vertical, transverse section taken on the line 2—2 of FIG. 1 with an intermediate portion broken out for convenience of illustration, the view being drawn to a moderately larger scale with the bicycle partially indicated by broken lines along an indicated center line through its structural frame;

FIG. 3, a view corresponding to that of FIG. 2 but with the bicycle supporting, columnar standard swung down on the pivot axis at its lower end following manual lowering of it and the bicycle, the rooftop of the vehicle and the transverse bars of the usual rooftop luggage carrier being indicated fragmentarily by broken lines; FIG. 4, a view in top plan as taken on the line 4—4 of FIG. 3, with a broken, arrowed line indicating how the lowered supporting standard can be swung from side-to-side thereof on the vertical centerline of the base turntable as a center of rotation for positioning when not in use, the frame of the attached bicycle being fragmentarily indicated by broken lines;

FIG. 5, a view in horizontal section taken on the line 5—5 of FIG. 3, and drawn to a larger scale;

FIG. 6, a view in end elevation taken on the line 6—6 of FIG. 5;

FIG. 7, a view in vertical longitudinal section taken on the line 7—7 of FIG. 2, the view being oriented for convenience as rotated ninety degrees to the left from the position of the apparatus in FIG. 2, and with an additional intermediate portion broken out for convenience of illustration;

FIG. 8, a view in transverse vertical section taken on the line 8—8 of FIG. 3 and drawn to a somewhat larger scale;

FIG. 9, a detail view in vertical section taken on the line 9—9 of FIG. 3 and drawn to a larger scale;

FIG. 10, a detail view in vertical section taken on the line 10—10, of FIG. 7;

FIG. 11, a detail view in elevation looking from the line 11—11 in FIG. 2 and drawn to a considerably larger scale, indicating by arrowed broken lines how the means for attaching the columnar standard to the frame of a bicycle can rotate from side-to-side;

FIG. 12, a view in vertical section taken on the line 12—12 of FIG. 11 showing the bicycle frame holding structure in closed condition when the columnar standard is in up or bicycle supporting position;

FIG. 13, a view in vertical section taken on the line 13—13 of FIG. 11;

FIG. 14, a view corresponding to that of FIG. 12 but taken on the line 14—14 of FIG. 4 and drawn to the scale of FIG. 12, showing the longitudinally open, center components of the bicycle frame holding structure of FIG. 12 rotated to the right from the position shown in FIG. 12 (the columnar standard is in the down or bicycle loading and unloading position) to permit removal of the bicycle from its held position of FIG. 12;

FIG. 15, an exploded view of the several structural components making up the bicycle frame attachment means of FIGS. 11-14;

FIG. 16, a side elevational view similar to that of FIG. 1 showing a different embodiment of bicycle frame holding structure and different embodiment of columnar standard;

FIG. 17, a view in vertical, transverse section taken on the line 17—17 of FIG. 16 with an intermediate portion broken away for ease of illustration and drawn to a moderately larger scale;

FIG. 18, a view corresponding to that of FIG. 17 but with the bicycle supporting, columnar standard swung down on the pivot axis at its lower end following manual lowering of it and the bicycle, with the lower portion of the base structure broken away;

FIG. 19, a side elevational view taken on the line 19—19 of FIG. 17;

FIG. 20, a transverse section taken on the line 20—20 of FIG. 19;

FIG. 21, a vertical section taken on the line 21—21 of FIG. 17;

FIG. 22, a transverse section taken on the line 22—22 of FIG. 17;

FIG. 23, a transverse section taken on the line 23—23 of FIG. 17;

FIG. 24, a vertical section taken on the line 24—24 of FIG. 17; and

FIG. 25, a vertical section similar to that of FIG. 24 but with the bicycle frame in a different position.

DETAILED DESCRIPTION OF THE ILLUSTRATED EMBODIMENT

Figure 1:
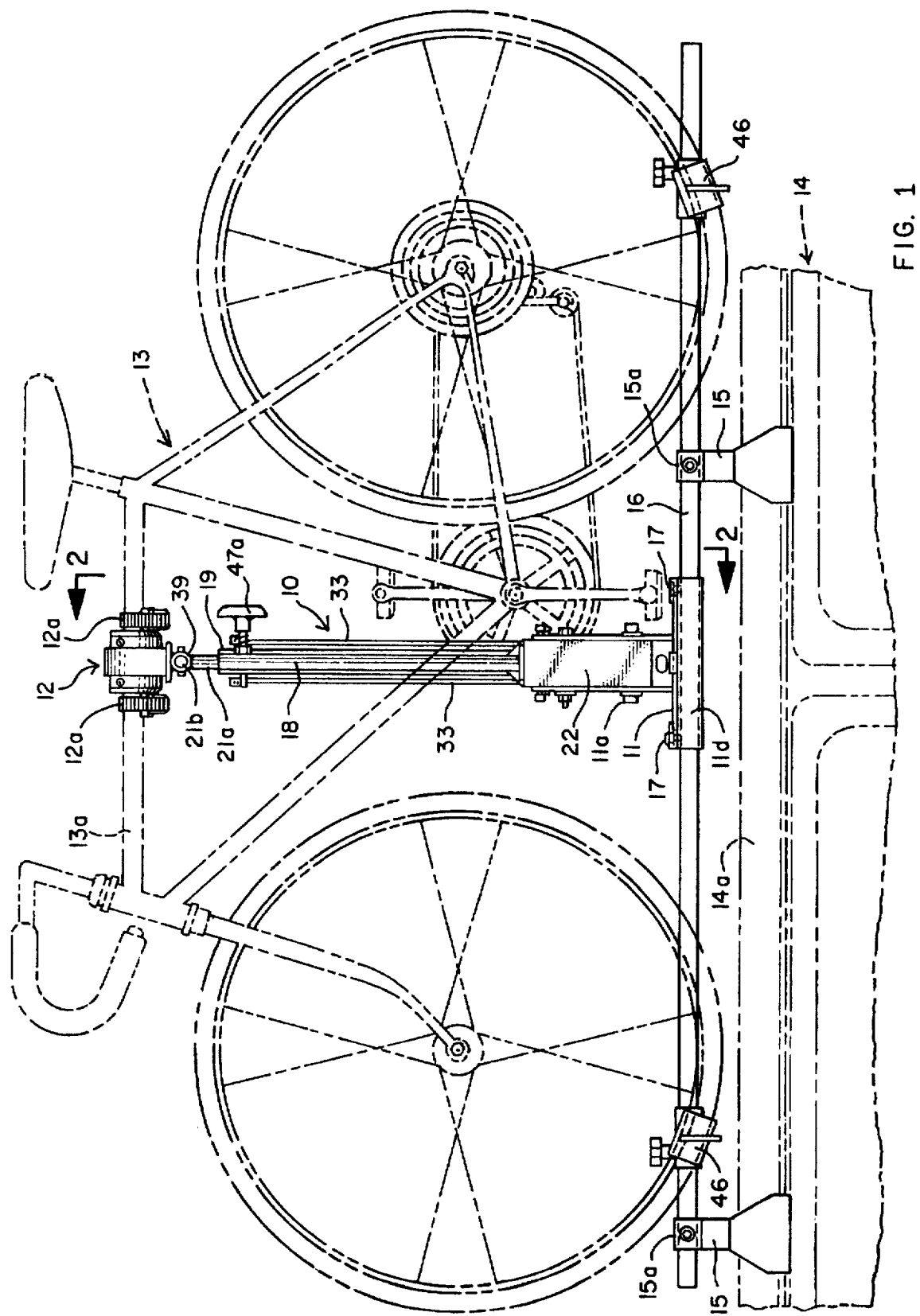

In the form illustrated, the apparatus of the invention comprises a bicycle-supporting columnar standard 10 (see particularly FIG. 1), pivotally mounted at its lower end by means of pivot bolts 11a, FIGS. 1, 2 and 6, on a turntable portion 11b of a platform 11c of base structure 11 to extend upright therefrom in the holding, by attachment means 12, of a bicycle 13 standing upright on and extending longitudinally along the rooftop 14a of an automotive vehicle 14 provided with a usual rooftop luggage carrier having longitudinally spaced, luggage-attaching bars 15 extending transversely across the rooftop 14a.

Base structure 11 is mounted on a pair of longitudinal bars 16 of the apparatus, which are preferably square in cross-section and slidably inserted through a pair of correspondingly tubular receiving members 11d, respectively, FIGS. 2–4, of base structure 11 at and extending along opposite sides of base platform 11c. Base structure 11 is secured to bars 16 as by screws 17. Tubular members 11d and platform 11c of base structure 11 are rigidly held together by reinforcing joist members 11e, and bars 16 are secured to bars 15 in any appropriate manner here shown as by screws 15a, FIG. 1.

Columnar standard 10 comprises two elongate structural tubes 18 and 19 fastened together lengthwise side-by-side, as by welding, and incorporates as a part thereof a power lift device 20 of well-known construction, preferably the previously referred to commercial product known as BLOC-O-LIFT wherein a manually operable control within a compressed air motivated piston and cylinder power lift assembly controls operation thereof. Here, such power lift device 20 is slidably fitted into tube 19 while the leg member 21a of an inverted L-shaped lift bar 21 serving as bicycle carrying structure is slidably fitted into tube 18, with the relatively short lift arm member 21b projecting at substantially a right angle from such tube 18 and carrying at its end bicycle attachment means 12 for attachment to the main bar 13a of the structural frame of what is here shown as a man's bicycle 13. By making means 12 rotatable on the end of lift arm member 21b, other bicycle frame configurations are also easily held, such as a woman's bicycle frame configuration.

As indicated in FIG. 3, where the apparatus is shown installed on the vehicle 14 as in FIGS. 1 and 2 but with standard 10 in the down position ready for attachment to a bicycle standing in upright position at the side of the vehicle, power lift tube 19 has a downward, rectangular extension 22, FIGS. 5–8, extending below the lower end of tube 18 and between spaced upstanding wall plates 23 of the base structure that are rigidly secured to turntable 11b, as by welding, and is pivotally attached to such upstanding wall plates 23 by and on pivot pins 11a that are screwed into an intermediate pivot body 25, see FIGS. 5 and 7, for rotation back and forth with the raising and lowering of columnar standard 10 on base 11.

Since internal constructional details of pneumatic lift devices 20 are well known, no illustration thereof appears here. Suffice it to point out that the lower end of a piston rod 20a of lift device 20, FIGS. 5 and 7, passes into and is secured to the rotatable intermediate pivot body 25 and that such piston rod is tubular for slidably receiving a push rod 26 having its lower end confronting a pivoted lever arm 27 within and extending transversely across the lower end of extension 22 of power lift tube 19 for movement about the pivot axis 27a of such lever arm by manually operating a mechanical switch 28, FIGS. 2 and 3, at one end of a flexible cable 29 whose lower end is attached at 29a, FIGS. 5, 6, and 7, to the free end of lever arm 27. Switch 28 may be fastened at any convenient place, as on lift arm member 21b, FIGS. 2 and 3, of lift bar 21.

Operation of switch 28 by the user of the apparatus standing at the bicycle loading side of the vehicle with columnar standard 10 in the down position of FIG. 3 and with a bicycle loaded into bicycle attaching means 12, will cause push bar 26 of power lift assist device 20 to operate the power lift assist device 20 to push cylinder 20b away from the anchored end of piston rod 20a within body 25 from the retracted position thereof shown by FIGS. 3 and 5, to the extended position thereof shown by FIGS. 2 and 7.

The cylinder head of cylinder 20b of power assist lift device 20 is fastened by a connecting member 30 to a crossbar 31, which extends transversely of tube 19 and is desirably encased within a slide block 32 of a suitable plastic material, such as "Nylon", and has its opposite ends, FIG. 10, extending through, projecting beyond, and slidable along respective longitudinal guide slots 19a, 19a of tube 19. Passing through crossbar 31 at the ends thereof and prevented from disengagement therewith by end enlargements 33a thereof are a set of ends, respectively, of a pair of flexible but substantially non-extensible connecting means, here shown as cables 33, 33, whose lower end portions extend around a pair of pulleys 34, 34, respectively, in the bottom portion of columnar standard 10 to anchorages in a crossbar 35, FIG. 8, that extends between and is preferably rotatable in wall plates 23, 23. This constitutes an attachment of the cables to the base structure.

Thus, when the power lift device 20 is operated by manipulation of control switch 28, travel of crossbar 31 along the opposite slots 19a in executing the power lift stroke of device 20 from the limit position thereof in which the columnar supporting standard 10 is down, as shown in FIG. 5, to the opposite limit position thereof in which the columnar standard 10 is upstanding, as shown in FIG. 7, the connection cables 33, 33 will transfer lift action of such power lift stroke to columnar standard 10 throughout the length of such power stroke, thereby forcing travel of the columnar standard about pivot bolts 11a throughout the entire angle of substantially ninety degrees from the down position of FIGS. 3 and 5 to the up position of FIGS. 2 and 7. With this arrangement, the substantially constant expansion force of the power lift device 20 is converted into lifting force which is substantially constant through the entire lift angle of the columnar standard.

A cross bolt 36 between upstanding wall plates 23 is preferably provided as a limit stop (guide slots 19 could alternately be sized to limit the stroke of power lift device 20 with the ends of guide slots 19 acting as limit stops) to prevent overtravel of columnar standard 10 after reaching the upstanding position thereof. Manual lowering of the upstanding columnar standard 10 from the rooftop will recharge power assist lift device 20 by recompressing air in cylinder 20b as the bicycle descends to lowered position and piston rod 20a is forced into cylinder 20b.

As shown in FIGS. 1–3, bicycle wheel clamps 46, 46 are slidably mounted fore and aft on the longitudinal bar 16 that is adjacent to bicycle 13 for receiving and clamping to such bar 16 the forward and rear wheels of the bicycle as held in upstanding position on vehicle rooftop 14a for travel. Such wheel clamps 46 are sloped and are slidable along bar 16 to compensate for differences in the height positioning of the bicycle with respect to bar 16. Thus, the higher the bicycle with respect to bar 16, the closer a clamp 46 will be to the lowest point of the wheel. However, since the height of bicycle frames and bicycle wheels vary, and only a limited amount of variation can be accommodated by the positioning of clamps 46 along bar 16, leg 21a of lift bar 21 is adjustably telescopically mounted in tube 18 by turning knob 47a of spring-loaded clamping screw 47 to loosen it from a previously clamped position of leg 21a within tube 18. The position of lift bar 21 can be adjusted so that the apparatus can carry variously sized bicycles.

If the apparatus remains on the rooftop between times when it is needed for carrying a bicycle, columnar standard 10 in its down position need merely be manually rotated about the vertical pivot axis of turntable 11b, such as is formed by bolt 11f, FIGS. 2–4, as indicated by arrows 11g in FIG. 4, to substantially align columnar standard 10 with longitudinal bars 16. Lift bar 21 may be rotated as necessary in receiving tube 18 by loosening knob 47a and rotating lift bar 21 to desired position to allow alignment with longitudinal bars 16.

Bicycle attachment means 12 may take a variety of forms to accomplish its intended purpose. In one presently preferred form, however, it comprises an open-ended outer cradle piece 37, FIGS. 11–15, open longitudinally at 37a and having a tubular projecting member 37b in which is rotatably received a stub shaft member 38a projecting at substantially right angles from a tubular member 38 in which is rotatably received lift arm member 21b of inverted L-shaped lift bar 21. Positional adjustment of such tubular member 38 on the received arm member 21b is provided for by a locking ring 39 having an indented end face 39a engaging a matingly indented and confronting end face 38b of tubular member 38. Locking ring 39 is fastened in place by a set of screws 39b. Cradle piece 37 is rotatably secured to stub shaft member 38a by retaining ring 38c received in annular groove 38d.

Rotatably fitted within outer cradle piece 37 is an elongate open-ended inner cradle or holding piece 40, open longitudinally at 40a and having oppositely extending end members 40b, 40b. Over opposite end portions of holding piece 40, are fitted respective open collars 41, 41 held in place by respective sets of screws 42 threaded into receiving holes 44 in holding piece 40. Collars 41 position and secure holding piece 40 in cradle piece 37. Mounted within holding piece 40 and extending over end members 40b, 40b is an inner tubular protective pad liner 43 of sponge plastic, which is also open longitudinally to coincide with opening 40a. Attached to end members 40b, 40b by respective attachment screws 45a, 45a are respective straps 12a, 12a and clamps 45, 45 for receiving and tightly clamping the free ends of respective straps 12a, 12a, FIGS. 1, 4, and 15, that are provided for encircling the bar 13a of the frame of bicycle 13 to which attachment means 12 is attached.

In the FIG. 3 down position (see also FIG. 14) of columnar standard 10, both outer cradle piece 37 and inner cradle or holding piece 40 with its protective pad liner 43 will be positioned on lift bar member 21b with their longitudinal entry openings 37a and 40a uppermost and aligned for receiving the frame bar 13a of bicycle 13. As such lift bar member 21a is raised to the up position of FIG. 2, see also FIGS. 12 and 13, inner cradle or holding piece 40 with its liner pad 43 will maintain its position with longitudinal opening 40a facing vertically upwardly to maintain bicycle 13 held therein in upright position and outer cradle piece 37 will automatically rotate about holding piece 40 to cover entry opening 40a of holding piece 40, as in FIG. 2, 12, and 13, to thereby hold the bicycle against disengagement from bicycle attaching means 12 while supported on the vehicle rooftop.

It should be noted that cradle piece 37 with holding piece 40 therein, when columnar standard 10 is in down position, is free to rotate about stub shaft 38a which in that position provides a horizontal pivot axis so that a bicycle frame member of substantially any orientation, i.e., a horizontal bar 13a as shown in FIG. 1 or a downwardly sloping bar as may be provided on some bicycles, such as women's bicycles, may be placed in holding piece 40 with the bicycle in substantially upright position. The extension of lift bar 21 can be adjusted to compensate for any particular location on the frame member placed into holding piece 40 to adjust the height of the bicycle when in position over the rooftop. The pivotal movement allowed by sleeve 38 on lift arm member 21b, which forms a horizontal pivot axis when the columnar standard is in up position, allows rotational movement of holding piece 40 so that the held bicycle 13 remains in upright position, or can be placed in upright position over the rooftop as shown in FIG. 1, regardless of the angle or slope of the bicycle frame member placed in holding piece 40. Some limit on this rotational movement will normally be desired and such limits will be established by the interaction of confronting end faces 38b and 39a of sleeve 38 and ring 39. The range of pivotal motion allowed is indicated by openings 39c, FIGS. 11 and 14.

FIGS. 16–25 show an alternate bicycle attachment means for use with the invention. Many bicycles today have a quick release seat mechanism wherein the bicycle frame includes a tubular frame member into which a tube secured to and extending from the seat is inserted. The tubular receiving frame member is contractible as by the provision of at least one slot, and a contracting device with lever is provided so that with the lever in one position, the receiving frame tube is unconstricted and the tube extending from the seat can be easily inserted into or taken from the frame member. When the seat is in desired position, the lever is moved to constrict the receiving frame tube and securely hold the tube extending from the seat therein. In this way, a seat can easily be adjusted or removed from the bicycle. A seat receiving frame tube of a bicycle frame is shown as 60 in FIGS. 16–19 and 24 and 25 with a quick release constricting device 61 mounted thereon and operable by lever 62, FIGS. 17 and 18.

The bicycle attachment means of FIGS. 16–25 includes a rod member 63 threaded onto attaching shank 64 mounted on the end of columnar standard 65. Rod member 63 is selected to fit into receiving frame member 60 in identical manner as a tube extending from a seat is inserted into such frame member 60. With rod member 63 inserted into the receiving frame member, lever 62 operates constricting device 61 to constrict frame member 60 about rod member 63 to secure the bicycle to rod member 63 and thereby to columnar standard 65. With the provision of rod member 63 removably screwed onto shank 64, it is easy to interchange rod members 63 of different diameters to provide a rod member 63 of desired size to fit any particular bicycle to be carried.

FIGS. 16–25 also illustrate an alternate columnar standard construction for the apparatus. Structural tube 18 is pivotally mounted on base 11 between upstanding wall plates 23 by pivot bolts 11a as previously described. Rather than providing a second tube, however, lift bar 66 includes a tube 67 which telescopically fits over the end of tube 18. Threaded shank 68 extending from handle 69 is screwed through nut 70 secured to tube 67 to tighten against tube 18 and hold tube 67 in desired adjusted position with respect to tube 18. Spring 71 tends to maintain shank 68 in tightened condition during normally occurring vibration of the vehicle and apparatus during travel.

Lift arm member 74, shown as a square tube welded in the end of tube 67, extends at a substantially right angle from the end of lift arm tube 67 and includes a ball joint rod end 75 secured to the end thereof. Shank 64 is provided as part of the ball joint rod end 75 and extends therefrom for attachment of rod member 63, this mounting allows rotational movement of rod member 63 and a bicycle attached thereto in substantially all directions similarly to the bicycle attaching means of FIGS. 11–15. Of course, the bicycle attaching means of FIGS. 11–15 could also be used with this embodiment of lift arm, or vice versa.

The pneumatic lift device in this embodiment is similar to and is operated similarly as previously described. However, since lift bar tube 67 slides over the outside of tube 18, it is preferable not to have a cross bar extend through slots in the tubes. In this embodiment a slidable plug 77, such as made of "Nylon" or other engineering plastic, is secured to the end of cylinder 20b to guide the stroke of the power lift device inside of tube 18, see FIG. 17. With this arrangement, a single cable 78 may be used with one end secured to the base as in the previous embodiment by means of cross bar 35, and extending around pulley 79 rotatably mounted to the lower portion of columnar standard 65 by axle 80, with its opposite end secured in plug 77. Since the cable 78 extends inside tube 18, pulley 79 can be mounted directly on tube 18 and the tube 18 can be pivotally mounted by pivot bolts 11a to plates 23 without rectangular extension 22. Operation of the apparatus is the same as described for the prior embodiment. Extension of power lift device 20 by movement of cylinder 20b with respect to piston rod 20a slides plug 77 outwardly toward the end of tube 67 thereby pulling cable 78 and causing columnar standard 65 to move to upright position. Manually pulling columnar standard 65 from its upright position to its lowered position shown in FIG. 18 causes cable 78 to slide plug 77 toward the bottom of tube 18 to contact the power lift device 20.

The particular power lift device shown includes the push rod 26 and operating switch 28 to allow selected operation of the power lift device. In some instances the power lift device or air spring will not include an internal control operable by the user. Such a device, when contacted such that the piston is moved into the cylinder, has to be held by some external latch in that contacted position. With such a power lift device, an external lock or latch will be provided, such as cooperable between the columnar standard and the base, to catch and hold the columnar standard in down or loading and unloading position when manually moved to that position. The latch would then be released, similarly to releasing switch 28 for the embodiments shown, to release the columnar standard and power lift device to move the columnar standard to its upright position.

In use, with the bicycle carrier mounted on a rooftop of a vehicle, the lift arm of the carrier is positioned in down, bicycle loading and unloading position. A bicycle, which is positioned in upright position beside the vehicle and aligned with the bicycle attachment means, is mounted to such attachment means. In the embodiment shown in FIGS. 1–4 and 11–15, the bicycle is lifted and a portion of the bicycle frame placed in the receiving cradle of the bicycle attachment means. If straps 12a are provided, the bicycle can be secured in the cradle by such straps and clamps 45. With the embodiment of FIGS. 16–25, the bicycle seat is removed and the rod element 63 attached to the lift arm 66 placed in the bicycle frame in place of the seat tube and the seat quick release mechanism is operated to secure the bicycle to the rod member. In either case, the arm is operated to release the power lift device which lifts the arm from down position to upright, bicycle supporting position wherein the bicycles are supported by the carrier over the rooftop of the vehicle. Preferably, the bicycle remains in upright position as it is lifted. Depending upon the particular power lift device used and the weight of the bicycles being lifted, the arm may lift the bicycle from down to up position without any help from the user, or it may be that the user may need to manually push the arm upwardly, with the power lift device providing most of the lifting power so that substantially less lifting power is provided by the user than if the power lift device was not present. With the bicycle in position over the vehicle rooftop, the wheels are preferably secured by wheel clamps.

To unload the bicycle, the wheel clamps are released and the user then pulls the bicycle outwardly and downwardly to pull the arm from upright to down position. The weight of the bicycle helps to counteract the lifting force of the power lift device so that the user can easily lower the bicycle. With the arm in lowered position, it is locked in such position so that the arm will remain in such position when the bicycle is removed. The bicycle is then removed from the bicycle attaching means. The arm can then be swung by means of the mounting turntable out of the way to a position usually aligned with longitudinal bar 16 above the vehicle rooftop until needed again.

While the carrier is shown mounted on a vehicle rooftop for lifting and holding the bicycle above the rooftop, and such device is particularly adapted for such use, it could be used to lift the bicycle or similar item onto the bed of a truck or to some other vehicle location or to some stationary storage location and such uses should be considered equivalent to the rooftop mounting and use of the carrier.

While two specific bicycle attachment means have been shown mounted on the end of the lift arm, it should be realized that various other bicycle attachment means could alternately be used. Further, it should be realized that the described bicycle attachment means can be used with other bicycle lift apparatus or other bicycle racks of various configuration, whenever it would be advantageous to do so.

While provision of the two mutually adjoining tubes 18 and 19 or telescoping tubes 67 and 18 are advantageous in the overall construction and operation of the presently contemplated best modes shown by the drawings and described above, it should be realized that this apparatus could be modified in various ways. Moreover, the entire apparatus could be modified along the line of the prior art or otherwise provided that thrust of the lift assist power device is applied to bicycle carrying structure. However, it should be realized that one of the advantages of the illustrated embodiments of the invention as herein described is the fact that positive lifting force will be exerted on the columnar standard throughout the entire ninety degree or more lift stroke extending from the substantially horizontal down position of such columnar standard to the substantially vertical up position thereof.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. An assisted lift bicycle carrier for installation on the rooftop of a vehicle, comprising a columnar standard for raising, lowering, and supporting on said rooftop, a bicycle in an upright position; a base for mounting on the rooftop of a vehicle; means for pivotally attaching the lower end of said columnar standard to said base on a substantially horizontal pivot axis; power lift means incorporated in said columnar standard and comprising an elongate piston and cylinder power lift device, for executing upward power lift and return reciprocative strokes, one of the piston and cylinder components of said power lift device having the lower end thereof pivotally fastened against longitudinal movement relative to the other component thereof, which other component is extendable longitudinally for carrying out the power lift strokes; guide means for said reciprocative strokes, said power lift device being operably associated with said guide means for guiding back and forth movement of said longitudinally extendable component of said power lift device; and flexible, elongate, but substantially longitudinally non-extendible power transfer means extending between the extendable component of the power lift device and the base, and having length such as will be tensioned during the power lift stroke of said power lift device to force said columnar standard to move upwardly from a down position to an upstanding position on the rooftop during a power lift stroke of said power lift device.

2. A bicycle carrier according to claim 1 wherein means are included for limiting pivotal movement of the columnar standard.

3. A bicycle carrier according to claim 2, wherein the limiting means includes spaced wall plates upstanding from the means for attaching the columnar standard to the rooftop of a vehicle and a limit stop member extending between said wall plates for halting upward travel of said columnar standard substantially at the desired upstanding position thereof on the lift stroke of the power lift means.

4. A bicycle carrier according to claim 1, wherein the columnar standard comprises a longitudinal structural element to which the power lift device is mounted; and wherein the guide means includes a guide slide extending laterally from the extendable component of said power lift device, and the said longitudinal structural element has longitudinally extending slideway means into which end portions of said guide slide project for guiding back and forth travel of said extendable component of said power lift device.

5. A bicycle carrier according to claim 4, wherein the longitudinal structural element is an elongate tube; the slideway means comprise opposite slots in and extending longitudinally along the walls of said tube; and the guide slide is a crossbar extending transversely across said tube within said slots for sliding movement longitudinally thereof.

6. A bicycle carrier according to claim 5, wherein the crossbar projects beyond the tube; and the flexible elongate but substantially non-extensible power transfer means are a pair of cables which have a set of corresponding ends attached to the projecting ends of the guide slide crossbar.

7. A bicycle carrier according to claim 6, wherein the means for pivotally attaching the lower end of the columnar standard comprises a base structure having a platform from which rise a pair of transversely spaced wall plates that are rigidly secured at their lower ends to said base structure and to which the lower end portions of the cables of the pair of cables are attached by means of a crossbar rotatably mounted in and extending between said wall plates.

8. A bicycle carrier according to claim 1, wherein the columnar standard comprises a longitudinal structural element in which the power lift device is mounted, and wherein the guide means includes a guide block mounted on the extendable component of said power lift device which slides within the longitudinal structural element.

9. A bicycle carrier according to claim 8, wherein the flexible elongate but substantially non-extensible power transfer means is at least one cable secured to the guide block.

10. A bicycle carrier according to claim 1, wherein the bicycle carrying structure comprises a lift bar having a longitudinal leg member extending longitudinally with the power lift device and having a lift arm member extending substantially perpendicularly from said leg member and carrying bicycle attaching means.

11. A bicycle carrier according to claim 10, wherein the bicycle attaching means comprise a mounting member rotatably attachable to the bicycle carrying structure and having its longitudinal axis substantially horizontal and substantially parallel with the longitudinal axis of said lift arm; and an elongate cradle structure rotatably attached to said mounting member and having a substantially horizontal longitudinal axis extending at substantially right angles to said axis of said mounting member and to said axis of said lift arm member, said cradle structure having outer and inner cradles with open-ended, longitudinal entry openings for receiving and holding a bar of the frame of the bicycle to be lifted to, held on, and lowered from the vehicle rooftop, said outer and said inner cradles being rotatably arranged relative to each other to place their entry openings facing upwardly when the columnar standard is in the down position and to place the entry opening of the outer cradle otherwise when the columnar standard is in the up position so said cradle structure will be closed for holding the said received bar member of the frame of the bicycle in the up position of the columnar standard.

12. A bicycle carrier according to claim 11, wherein the inner cradle has length exceeding that of the outer cradle, such excess length being encompassed at opposite ends of the outer cradle by a pair of open collars, respectively, the inner cradle having lower end members extending longitudinally therefrom, and means for clamping the received bar of the bicycle frame to said cradle structure using said longitudinally extending lower ends of the inner cradle.

13. A bicycle carrier according to claim 10, wherein the bicycle attaching means comprises a rod member extending from the lift bar, said rod member being of a diameter to fit closely within a seat receiving bicycle frame member having a quick release seat feature whereby when the rod member is inserted into the seat receiving bicycle frame member and the quick release seat feature is operated in a manner to secure a seat to the frame member, the bicycle is secured to the rod member and thereby to the carrier.

14. A bicycle carrier according to claim 1, wherein the piston component of the power lift device includes a tubular piston rod, wherein the power lift device has a push rod control for activating the power stroke of said device extending through the inside of the tubular piston rod and projecting from the end thereof; means for pushing longitudinally the projecting end of said push rod for initiating a power lift stroke of said power lift device; and manually operable control means for operating said means for pushing the projecting end of said push rod.

15. A bicycle carrier according to claim 14, wherein the means for pushing the projecting end of the push rod comprises lever means pivotally mounted adjacent the end of the piston rod and extending into contact with the push rod.

16. A bicycle carrier according to claim 15, wherein the manually operable control means comprises a flexible cable extending from a manually operable lever to operable connection with the lever means of the means for pushing the projecting end of the push rod.

17. A bicycle carrier according to claim 16, wherein clamping means are provided in association with the manually operable lever for attaching the lever to the bicycle carrying structure.

18. A bicycle carrier according to claim 1, wherein the means for mounting on the rooftop comprises a platform; an upstanding structure rigidly mounted on said platform to which the lower end of the columnar standard is pivotally attached; and longitudinally extending bars slidably attached to and extending along opposite sides of said platform for attachment to transversely extending bars of a luggage carrier affixed to said rooftop.

19. An assisted lift bicycle carrier according to claim 18, wherein the base structure includes a turntable mounted on the platform thereof; and the upstanding structure is mounted on said turntable.

20. An assisted lift bicycle carrier according to claim 18, wherein bicycle wheel receiving and clamping means are mounted fore and aft on said longitudinally extending bars for anchorage at selected positions therealong.

21. A bicycle carrier, comprising a bicycle carrying structure; means for attaching said structure to a vehicle; a self-powered fluid actuated, piston and cylinder assembly provided with manually operated control means for initiating a lift stroke thereof; means for interconnecting the bicycle carrying structure with the piston and cylinder assembly on a substantially horizontal pivot axis; and flexible cable means for transferring lift power from the piston and cylinder assembly to the bicycle carrying structure throughout the lift stroke of said piston and cylinder assembly and movement of said structure from substantially horizontal to substantially vertical positions thereof.

22. A bicycle attaching device for a bicycle carrier apparatus that has an attachment bar for receiving said device, the device comprising mounting means adapted for rotatable attachment to said attachment bar; and an elongate cradle structure rotatably attached to said mounting means, said cradle structure having outer and inner cradles with open ended, longitudinal entry openings for receiving and holding a bar member of the frame of a bicycle to be lifted to, held on, and lowered from the rooftop of a vehicle; said outer and said inner cradles being rotatably arranged relative to each other to place their entry openings facing upwardly when the attachment bar is in a down position and to place the entry opening of the outer cradle otherwise when the attachment bar is in an up position so said cradle structure will be closed for holding the received bar member of the frame of the bicycle in the up position of the attachment bar.

23. A bicycle attaching device according to claim 22, wherein the inner cradle has length exceeding that of the outer cradle, such excess length being encompassed at opposite ends of the outer cradle by a pair of open collars, respectively, the inner cradle having lower end members extending longitudinally therefrom, and means for clamping the received bar member of the bicycle frame to said cradle structure using said longitudinally extending lower ends of the inner cradle.

24. A bicycle attaching device for a bicycle carrier apparatus that has an attachment bar for receiving said bicycle attaching device, and for use when the bicycle carried by said bicycle carrier apparatus has a quick release seat feature, the attaching device comprising a rod member extending from the attachment bar, said rod member being of a diameter to fit closely within a seat receiving bicycle frame member having said quick release seat feature when the seat is released from the frame member whereby when the rod member is inserted into the seat receiving bicycle frame member in place of the seat and the quick release seat feature is operated in a manner to secure a seat to the frame member, the bicycle is secured to the rod member and thereby to the carrier apparatus.

25. A bicycle attaching device according to claim 24, wherein the rod member is removably secured to the attachment bar so that a rod member of a particularly desired outside diameter can be easily secured to the attachment bar.

26. A bicycle attaching device according to claim 24, wherein the rod member is secured to the attachment bar in a manner to allow rotational movement of the rod member in three planes with respect to the attachment bar.

27. A carrier for attachment to vehicles, comprising a columnar standard; carrying structure extending from the columnar standard: a base mounting the columnar standard for pivotal movement about a pivot axis between a loading position and a carrying position; means for attaching the base to a vehicle; a power lift device mounted for movement with the columnar standard for exerting power through a substantially longitudinal power stroke in at least one direction; and flexible cable means for transferring power from the power lift device through the flexible cable means to cause movement of the columnar standard and carrying structure from the loading position to the carrying position.

28. A carrier for vehicles according to claim 27, wherein the power lift device comprises a self-powered, fluid actuated, piston and cylinder assembly provided with manually operated control means for initiating the power stroke thereof.

29. A carrier for vehicles according to claim 27, additionally including means for limiting the power stroke when the carrying structure reaches the carrying position.

\* \* \* \* \*